(12) United States Patent
Hozumi et al.

(10) Patent No.: US 9,321,376 B2
(45) Date of Patent: Apr. 26, 2016

(54) VEHICLE SEAT DEVICE

(75) Inventors: Soichiro Hozumi, Nishio (JP); Toshiro Maeda, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 58 days.

(21) Appl. No.: 14/119,116

(22) PCT Filed: May 17, 2012

(86) PCT No.: PCT/JP2012/062689
§ 371 (c)(1),
(2), (4) Date: Nov. 20, 2013

(87) PCT Pub. No.: WO2012/161094
PCT Pub. Date: Nov. 29, 2012

(65) Prior Publication Data
US 2014/0084656 A1    Mar. 27, 2014

(30) Foreign Application Priority Data

May 25, 2011 (JP) .................. 2011-116936
May 25, 2011 (JP) .................. 2011-116937
May 25, 2011 (JP) .................. 2011-116938

(51) Int. Cl.
*B60N 2/02* (2006.01)
*B60N 2/08* (2006.01)
(Continued)

(52) U.S. Cl.
CPC .............. *B60N 2/0881* (2013.01); *B60N 2/002* (2013.01); *B60N 2/0228* (2013.01); *B60N 2/0244* (2013.01); *B60N 2/06* (2013.01); *B60N 2/08* (2013.01); *B60N 2/442* (2013.01);
(Continued)

(58) Field of Classification Search
CPC .......... B60N 2/02; B60N 2/00; B60N 2/4279; B60N 2/0248; B60N 2/08; B60N 2002/4455; B60N 2/06; B60N 2/0881; B60N 2/43; B60N 2/44; B60R 2021/01034; B60R 21/01554
USPC .......................................................... 701/49
See application file for complete search history.

(56) References Cited

U.S. PATENT DOCUMENTS 5,187,665 A * 2/1993 Futami et al. ................... 701/49
6,986,493 B2   1/2006 Yokota
(Continued)

FOREIGN PATENT DOCUMENTS

CN    1692031 A    11/2005
CN    1810538 A    8/2006
(Continued)

OTHER PUBLICATIONS

Office Action issued Aug. 19, 2014, in Japanese Patent Application No. 2011-116936 with partial English translation.
(Continued)

*Primary Examiner* — Jason Holloway
(74) *Attorney, Agent, or Firm* — Oblon, McClelland, Maier & Neustadt, L.L.P.

(57) ABSTRACT

A vehicle seat device includes a lock mechanism, which restricts sliding movement of a seat, a drive source, which drives the lock mechanism to restrict and cancel restriction on the basis of operation of an operation switch, and a control portion, which controls the drive source. The control portion performs at least one of cancellation limitation control, restriction limitation control, and forced restriction control.

14 Claims, 8 Drawing Sheets

(51) Int. Cl.
  *B60N 2/00* (2006.01)
  *B60N 2/06* (2006.01)
  *B60N 2/44* (2006.01)
  *B60N 2/427* (2006.01)
  *B60R 21/015* (2006.01)

(52) U.S. Cl.
  CPC ...... *B60N 2/4279* (2013.01); *B60N 2002/4455* (2013.01); *B60R 21/01554* (2014.10)

(56) References Cited

U.S. PATENT DOCUMENTS

| | | | |
|---|---|---|---|
| 8,052,112 B2* | 11/2011 | Lawall et al. | 248/429 |
| 8,630,772 B2* | 1/2014 | Ieda et al. | 701/45 |
| 2004/0222348 A1 | 11/2004 | Yokota | |
| 2005/0240329 A1* | 10/2005 | Hirota | 701/41 |
| 2009/0218843 A1 | 9/2009 | Wojatzki et al. | |
| 2010/0191426 A1* | 7/2010 | Miyajima et al. | 701/49 |
| 2011/0035116 A1* | 2/2011 | Ieda et al. | 701/45 |
| 2011/0087386 A1 | 4/2011 | Steinhauser et al. | |
| 2014/0097657 A1* | 4/2014 | Hozumi et al. | 297/344.1 |
| 2014/0277952 A1* | 9/2014 | Farquhar et al. | 701/49 |
| 2014/0277953 A1* | 9/2014 | Hozumi et al. | 701/49 |

FOREIGN PATENT DOCUMENTS

| | | |
|---|---|---|
| CN | 201102487 Y | 8/2008 |
| JP | 50 90328 | 7/1975 |
| JP | 63 284043 | 11/1988 |
| JP | 7-5894 U | 1/1995 |
| JP | 8-164779 A | 6/1996 |
| JP | 10-157619 A | 6/1998 |
| JP | 2003-118443 A | 4/2003 |
| JP | 2004-136832 A | 5/2004 |
| JP | 2004-142643 A | 5/2004 |
| JP | 2004-249962 | 9/2004 |
| JP | 2004 330940 | 11/2004 |
| JP | 2005 206154 | 8/2005 |
| JP | 2005-280373 A | 10/2005 |
| JP | 3840554 | 8/2006 |
| JP | 2006-335148 A | 12/2006 |
| JP | 2006 347470 | 12/2006 |
| JP | 2006-347514 | 12/2006 |
| JP | 2007 269134 | 10/2007 |
| JP | 2008 230532 | 10/2008 |
| JP | 2010 76553 | 4/2010 |

OTHER PUBLICATIONS

Extended European Search Report issued Nov. 7, 2014 in Patent Application No. 12789779.1.
The Extended European Search Report issued Nov. 7, 2014, in Application No. / Patent No. 12789231.3-1758 / 2716491.
International Search Report Issued Jun. 19, 2012 in PCT/JP12/062689 Filed May 17, 2012.
International Preliminary Report on Patentability issued Nov. 26, 2013 in PCT/JP2012/062689 filed May 17, 2012.
Written Opinion issued Jun. 19, 2012 in PCT/JP2012/062689 filed May 17, 2012 (English translation only).
Combined Office Action and Search Report issued May 4, 2015 in Chinese Patent Application No. 201280024718.3 (with English Translation of Category of Cited Documents).
Combined Office Action and Search Report issued May 26, 2015 in Chinese Patent Application No. 201280024737.6 (with partial English translation).
Office Action issued Jun. 23, 2015 in Japanese Patent Application No. 2014-193967 (with partial English translation).
Notice of Allowance and Fee(s) due mailed Dec. 9, 2014, in co-pending U.S. Appl. No. 14/119,082.
The Extended European Search Report issued Nov. 7, 2014, in Application No. / Patent No. 12789231.3 — 1758/2716491.

* cited by examiner

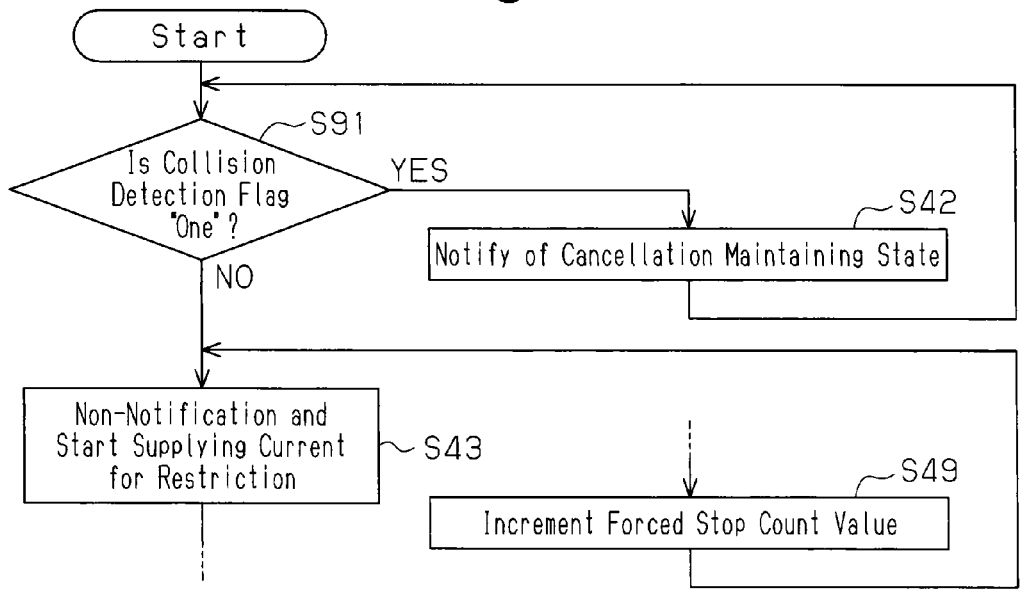
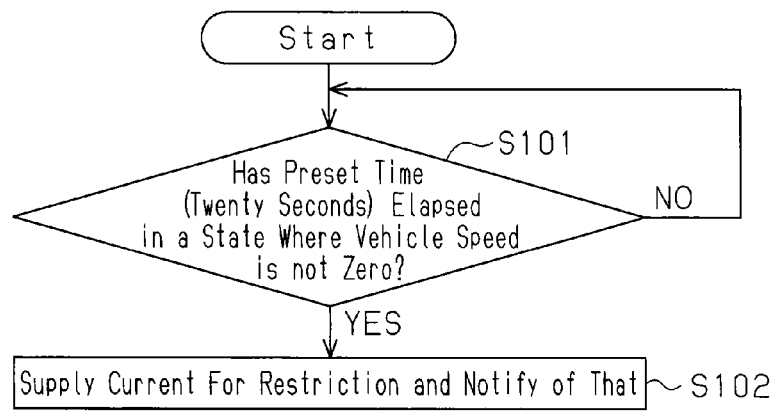
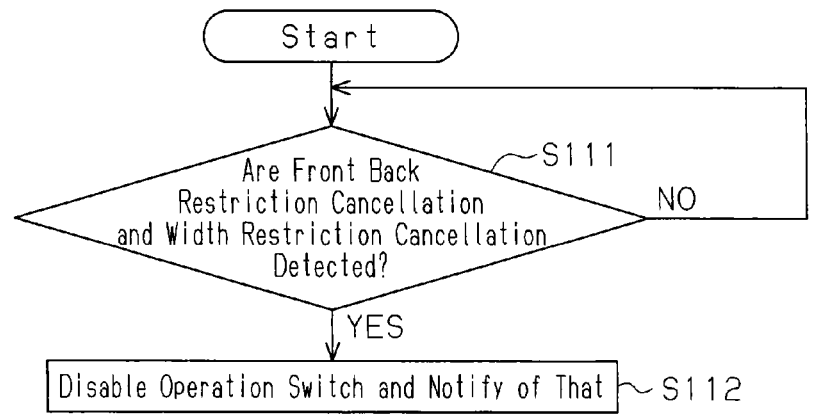

VEHICLE SEAT DEVICE

FIELD OF THE INVENTION

The present invention relates to a vehicle seat device.

BACKGROUND OF THE INVENTION

Conventionally, an example of a vehicle seat device as described in Japanese Laid-Open Patent Publication No. 2005-206154 is known. The vehicle seat device includes a lock mechanism, which restricts a sliding movement of a seat in the vehicle front back direction, and a drive source (actuator) for canceling the restriction of the lock mechanism on the basis of the operation of an operation switch. When current is supplied from a controller to the drive source on the basis of the operation of the operation switch, the drive source pulls a wire connected to the lock mechanism to cancel the restriction of the lock mechanism. In contrast, when the current is no longer supplied from the controller to the drive source, the restriction of the lock mechanism is performed by the urging force of a spring.

SUMMARY OF THE INVENTION

In the above described vehicle seat device, the drive source is operated on the basis of the operation of an automatic restoration type operation switch. If an occupant does not bias the operation switch, namely if the hand of the occupant is taken off the operation switch, the operation switch is automatically restored to its original position so that the current is no longer supplied to the drive source. Then, the movement of the seat device by the lock mechanism is restricted by the biasing force of the spring. Accordingly, the seat is moved, or allowed to slide, only when the occupant biases the operation switch. Therefore, further improvement of the convenience of the vehicle seat device is desired.

In the above described vehicle seat device, when the occupant operates the operation switch, the restriction of the sliding movement of the seat by the lock mechanism is cancelled regardless of the situation of the vehicle so that the seat may be allowed to slide. Therefore, for example, the seat may slide abruptly.

When the driver maintains operation of the operation switch, even if the vehicle situation is changed to be unfavorable for the sliding movement of the seat, for example, the cancellation of the restriction of the sliding movement of the seat by the lock mechanism is maintained. Accordingly, the seat is likely to be allowed to slide.

Accordingly, it is an objective of the present invention to provide a vehicle seat device that is more convenient.

Another objective of the present invention is to provide a vehicle seat device that can limit abrupt sliding of the seat or fix the seat by allowing the lock mechanism to perform the restriction immediately, regardless of the operation of the operation switch when the vehicle situation is changed.

In order to achieve the above described objective, a vehicle seat device including a lock mechanism, a drive source, and a control portion is provided. The lock mechanism restricts sliding movement of a seat. The drive source drives the lock mechanism to restrict the sliding movement of the seat and cancel the restriction thereof based on operation of an operation switch. The control portion performs at least one of cancellation limitation control, restriction limitation control, and forced restriction control. In the cancellation limitation control, the control portion controls the drive source such that when cancelling the restriction by the lock mechanism based on the operation of the operation switch, a state in which the restriction by the lock mechanism is performed is maintained until preset cancellation conditions, other than operation of the operation switch, are satisfied. In the restriction limitation control, the control portion controls the drive source such that when performing the restriction by the lock mechanism based on the operation of the operation switch, a state in which cancellation of the restriction by the lock mechanism is maintained until preset restriction conditions, other than operation of the operation switch, are satisfied. In the forced restriction control, the control portion controls the drive source such that when the restriction by the lock mechanism is cancelled based on the operation of the operation switch, when forced restriction conditions, other than operation of the operation switch, are satisfied, the seat is restricted by the lock mechanism regardless of the operation of the operation switch.

According to the above configuration, in the case where the seat is restricted by the lock mechanism by the operation of the operation switch, the control portion controls the drive source such that the cancellation of the restriction by the lock mechanism is maintained until the preset restriction conditions, other than operation of the operation switch, are satisfied (restriction limitation control). Therefore, for example, the seat is freely movable until the restriction conditions are satisfied, even when the operation switch is not operated, to improve the convenience of the seat.

Further, in the case where the restriction by the lock mechanism is cancelled on the basis of the operation of the operation switch, the control portion controls the drive source such that the state in which the restriction by the lock mechanism is performed is maintained until the preset cancellation conditions, other than operation of the operation switch, are satisfied (cancellation limitation control). Accordingly, the seat is not freely movable until the cancellation conditions are satisfied, even if the operation switch is operated. Therefore, for example, abrupt sliding of the seat is limited.

Moreover, in the case where the restriction by the lock mechanism is cancelled on the basis of the operation of the operation switch, when the preset forced restriction conditions, other than operation of the operation switch, are satisfied, the control portion controls the drive source such that the seat is restricted by the lock mechanism regardless of the operation of the operation switch (forced restriction control). Accordingly, for example, in the case where the restriction by the lock mechanism is cancelled, when the vehicle situation is changed, the seat is fixed by allowing the lock mechanism to perform the restriction immediately regardless of the operation of the operation switch.

Effects of the Invention

According to the vehicle seat device of the present invention, the convenience is improved.

According to the vehicle seat device of the present invention, abrupt sliding of the seat is limited.

Further, according to the vehicle seat device of the present invention, when the vehicle situation is changed, the seat is fixed by allowing the lock mechanism to perform the restriction immediately regardless of the operation of the operation switch.

BRIEF DESCRIPTION OF THE DRAWINGS

FIG. 10 is a flowchart for illustrating a process executed by the ECU of the other embodiment;

FIG. 11 is a flowchart for illustrating a process executed by the ECU of the other embodiment;

FIG. 12 is a flowchart for illustrating a process executed by the ECU of the other embodiment.

DETAILED DESCRIPTION OF THE PREFERRED EMBODIMENTS

Figure 1:
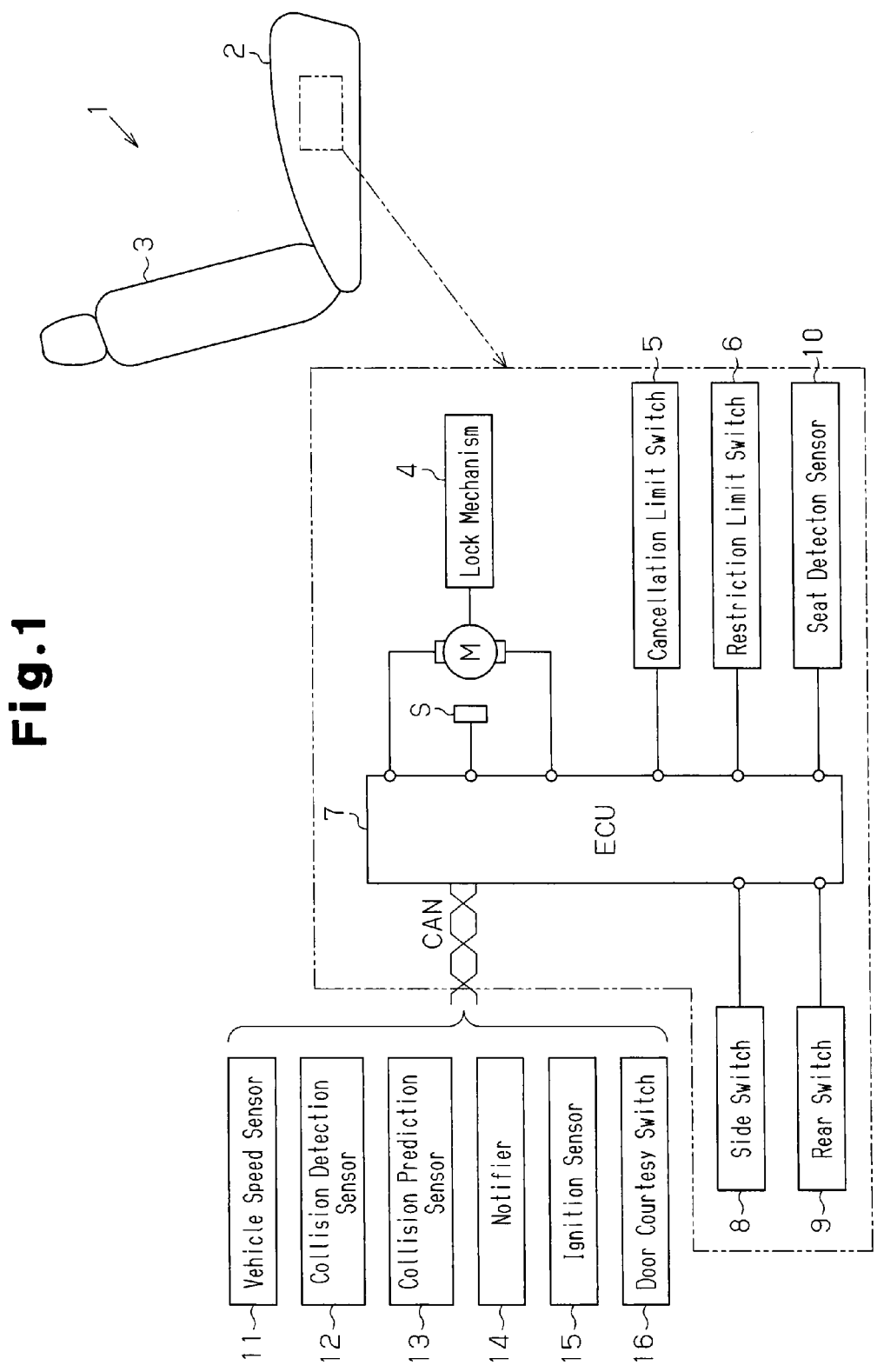
FIG. 1 is a block diagram for illustrating a vehicle seat device according to a present embodiment of the present invention.

Hereinafter, a vehicle seat device according to an embodiment of the present invention will be described with reference to FIGS. 1 to 5. As shown in FIG. 1, a seat 1 includes a seat cushion 2 forming a seat portion, and a seat back 3 pivotally supported by a rear end portion of the seat cushion 2.

A lock mechanism 4, which restricts the sliding movement of the seat 1, is provided in the seat 1. A motor M as a drive source, which drives the lock mechanism 4 to restrict the sliding movement of the seat 1 and cancel the restriction, is provided in the seat 1. The seat 1 of the present embodiment is provided in a slidable manner along a lower rail (not shown), which is fixed to a vehicle floor and extends in the vehicle front back direction. The lock mechanism 4 restricts the sliding movement of the seat 1. The lock mechanism 4 is publicly known, and, specifically, restricts the sliding movement of the seat 1 by inserting a lock pawl formed on the seat 1 into any of a plurality of lock holes formed in the lower rail. As for the motor M, the output portion thereof is connected to the lock mechanism 4. The motor M has a self-constriction force by which the output portion is prevented from moving in the non-current supplied state. In contrast, in the current supplied state, the motor M drives the output portion in two directions, namely a forward direction as a direction in which the restriction by the lock mechanism 4 is cancelled, and a reverse direction as a direction in which the restriction is performed in accordance with the direction in which the current is supplied. A rotation sensor S, which detects the number of rotations of the rotation axis of the motor M, is provided for the motor M. The rotation axis is connected to the output portion.

A cancellation limit switch 5, which serves as a cancellation detection portion that detects that the restriction by the lock mechanism 4 is cancelled by contacting/separating from contacting a part of the lock pawl or the output portion, and a restriction limit switch 6, which serves as a restriction detection portion that detects that the restriction by the lock mechanism 4 is performed, are provided in the seat 1, for example.

An electronic control unit ECU 7 as a control portion for controlling the motor M, and a side switch 8 and a rear switch 9 as operation switches for operating the restriction by the lock mechanism 4 and the cancellation of the restriction thereof are provided in the seat 1. The side switch 8 is arranged on a lateral surface of the seat cushion 2, and the rear switch 9 is arranged on a rear surface of the seat back 3. The side switch 8 or the rear switch 9 corresponds to an automatic restoration push button type operation switch, which is set to maintain the cancelled state when it is biased (pushed), and be automatically restored to cause the restricted state when it is not biased (not pushed). A seat detection sensor 10, which detects whether or not an occupant has been seated on the seat 1, is provided in the seat 1.

Next, an electric configuration of the vehicle seat device of the present embodiment will be described.

As shown in FIG. 1, the motor M (including the rotation sensor S), the cancellation limit switch 5, the restriction limit switch 6, the side switch 8 or the rear switch 9, and the seat detection sensor 10 are electrically connected to the ECU 7. A vehicle speed sensor 11, a collision detection sensor 12, a collision prediction sensor 13, and a notifier 14 are connected through in-vehicle network, namely controller area network CAN or a module, which is not shown, to the ECU 7. The collision detection sensor 12 corresponds to an acceleration sensor, which detects that the vehicle collides or is collided, for example. The collision prediction sensor 13, for example, corresponds to a rear radar, which detects a distance between the vehicle and a following vehicle and that the vehicle is likely to be or most likely to be collided by the following vehicle. The notifier 14 corresponds to an indicator including a car navigation display or an alert lamp, which makes a visual notification, or a speaker, which makes an audible notification. Parts such as an ignition sensor 15 and a door courtesy switch 16 are also connected through the in-vehicle network, namely CAN or the module, which is not shown, to the ECU 7.

The ECU 7 controls the current supply to the motor M on the basis of the operation of the operation switch (the side switch 8 or the rear switch 9).

Figure 2:
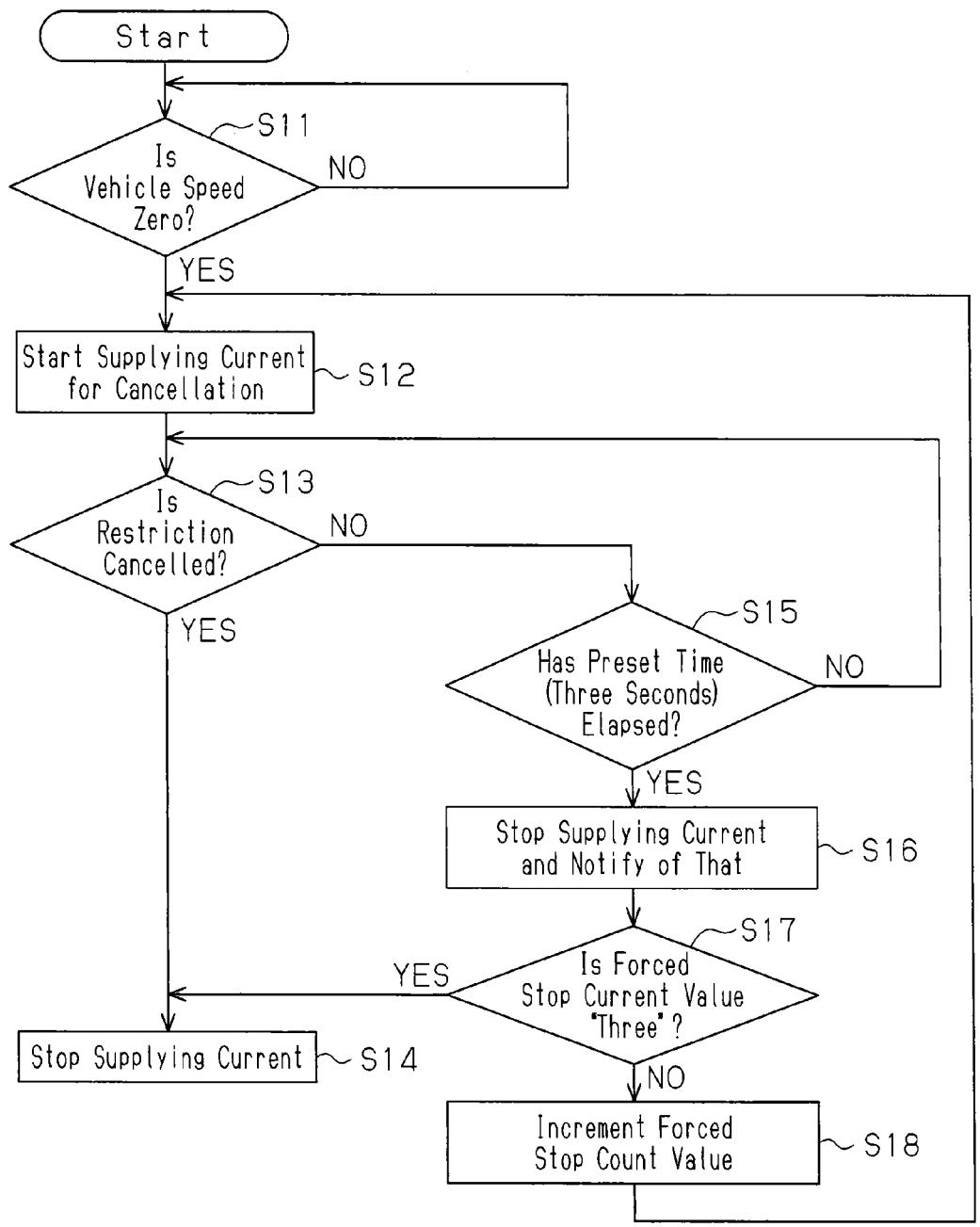
FIG. 2 is a flowchart for illustrating a process executed by an electronic control unit (ECU) according to the present embodiment.

For example, when the side switch 8 is being pushed to cancel the restriction by the lock mechanism 4, the ECU 7 starts a process shown in FIG. 2, and controls the motor M to maintain the state in which the restriction by the lock mechanism 4 is performed until preset cancellation conditions, other than operation of the operation switch (the side switch 8 or the rear switch 9), are satisfied (cancellation limitation control).

More specifically, the cancellation conditions of the present embodiment correspond to vehicle speed cancellation conditions, which are satisfied by a fact that the vehicle speed is zero when the operation switch (the side switch 8 or the rear switch 9) is operated. That is, in step S11, the ECU 7 determines whether or not the vehicle speed detected by the vehicle speed sensor 11 is zero. If the ECU 7 determines that the vehicle speed is zero, the process proceeds to step S12. If the vehicle speed detected by the vehicle speed sensor 11 is not zero, namely the vehicle is running, step S11 is repeated.

In step S12, the ECU 7 starts supplying the current to the motor M to drive the output portion in the forward direction as a direction in which the restriction by the lock mechanism 4 is cancelled, and the process proceeds to step S13.

In step S13, the ECU 7 determines whether or not the cancellation limit switch 5 has detected that the restriction by the lock mechanism 4 has been cancelled. If the cancellation limit switch 5 detects that the cancellation has been performed, the process proceeds to step S14 to stop supplying the current to the motor M. If the cancellation limit switch 5 does not detect that the cancellation is performed, the process of the ECU 7 proceeds to step S15.

In step S15, the ECU 7 determines whether or not a preset time (for example, three seconds) has elapsed since the supply of current began. If the preset time (for example, three seconds) has not elapsed, the process returns to step S13. That is, when cancelling the restriction on the basis of the operation of the operation switch (the side switch 8 or the rear switch 9), the ECU 7 supplies the current to the motor M such that the output portion is driven in the forward direction until the cancellation limit switch 5 detects the cancellation and stops supplying the current to the motor M if the cancellation is detected before the preset time (for example, three seconds) elapses. The preset time (for example, three seconds) in step S15 corresponds to a time in which the cancellation of the restriction is detected by the cancellation limit switch 5 before the time elapses when normally operated. For example, the preset time corresponds to a time that elapses when certain failure is caused in a power transmission pathway.

In step S15, if the preset time (for example, three seconds) has elapsed, the process of the ECU 7 proceeds to step S16.

In step S16, the ECU 7 stops supplying the current to the motor M, and operates the notifier 14 to be in the notifying mode to allow the notifier 14 to provide notice of the state (for example, the fact that the cancellation is not normally performed), and the process proceeds to step S17. That is, in the case where preset forced stop conditions, other than detection by the cancellation limit switch 5 or the restriction limit switch 6, are satisfied when the ECU 7 supplies the current to the motor M, the ECU 7 stops supplying the current to the motor M. The forced stop conditions of the present embodiment correspond to a time lapse forced stop condition, which is satisfied if a preset time (for example, three seconds) has elapsed.

In step S17, the ECU 7 determines whether or not a forced stop count value is "three". If the forced stop count value is not "three", the process proceeds to step S18. In step S18, the ECU 7 increments the forced stop count value (an initial value is "zero") by one (+1), and the process returns to step S12. In step S17, if the forced stop count value is "three", the process proceeds to step S14 and the discontinuation of the supply of current to the motor M is maintained. That is, if the preset time (for example, three seconds) has elapsed without detection of the cancellation by the cancellation limit switch 5, the ECU 7 stops supplying the current to the motor M. Thereafter, a retry control for supplying the current to the motor M again is repeated a preset number of times (in this example, three times).

Figure 3:
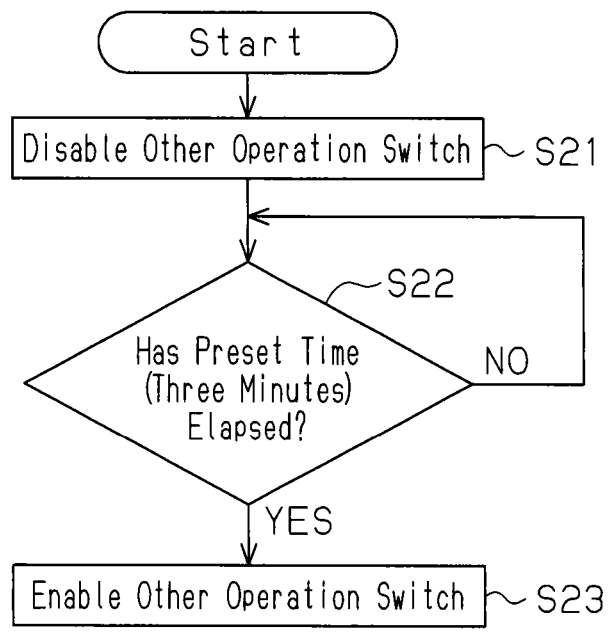
FIG. 3 is a flowchart for illustrating a process executed by the ECU of the present embodiment.

For example, if the side switch 8 is pushed to cancel the restriction by the lock mechanism 4, the ECU 7 starts a process (restriction cancellation control) shown in FIG. 3 in parallel with the process shown in FIG. 2. In step S21, the ECU 7 disables the operation of the other operation switch (operation switch except for the operated side switch 8), namely the rear switch 9, and the process proceeds to step S22.

In step S22, the ECU 7 determines whether a preset time (for example, three minutes) has elapsed. If the preset time (for example, three minutes) has elapsed, the process proceeds to step S23 to enable the operation of the other operation switch, namely the rear switch 9. If the preset time (for example, three minutes) has not elapsed, step S22 is repeated. In the present embodiment, time termination conditions, which are satisfied if the preset time (for example, three minutes) has elapsed, correspond to priority termination conditions (corresponding to conditions for terminating giving priority to the first operated operation switch). That is, the ECU 7 starts controlling the motor M on the basis of the operation of the first operated one (side switch 8) of the side switch 8 and the rear switch 9, and thereafter disables the operation of the other operation switch (rear switch 9) until the time termination conditions (priority termination conditions) are satisfied.

Figure 4:
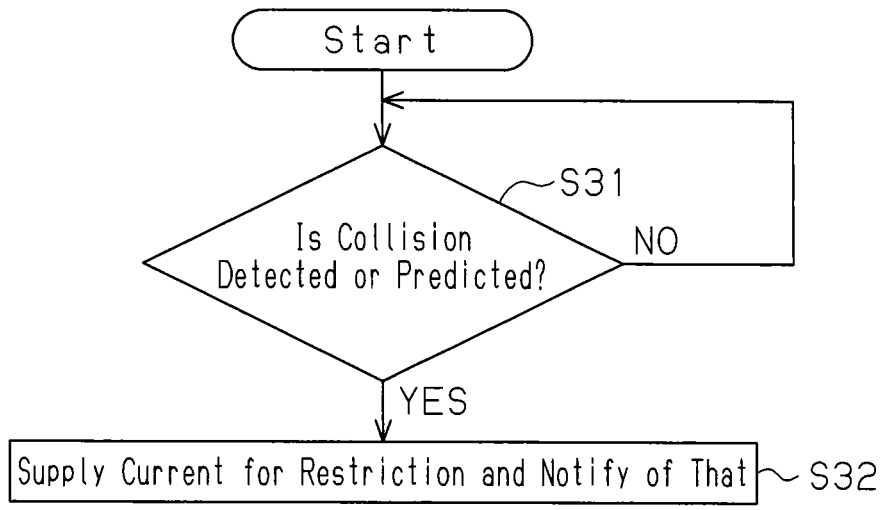
FIG. 4 is a flowchart for illustrating a process executed by the ECU of the present embodiment.

When it is detected that the restriction has been cancelled in step S13 (refer to FIG. 2), the ECU 7 starts a process shown in FIG. 4 in parallel with the process in step S14.

As shown in FIG. 4, in step S31, the ECU 7 determines whether or not the collision detection sensor 12 and the collision prediction sensor 13 detect a vehicle collision or determine that the vehicle collision is likely to be caused. If the ECU 7 determines that the vehicle collision is detected or the vehicle collision is likely to be caused, the process of the ECU 7 proceeds to step S32. If the vehicle collision is not detected and it is determined that the vehicle collision is not likely to be caused, step S31 is repeated.

In step S32, the ECU 7 supplies the current to the motor M such that the output portion is driven in the reverse direction as a direction in which the restriction by the lock mechanism 4 is performed so that the restriction by the lock mechanism 4 is performed, and operates the notifier 14 to be in the notifying mode to allow the notifier 14 to provide notice of the state (for example, the restriction by the lock mechanism 4 is performed due to an emergency state). That is, in the case where the restriction by the lock mechanism 4 was cancelled on the basis of the operation of the operation switch (the side switch 8 or the rear switch 9), if forced restriction conditions except for the operation of the operation switch are satisfied, the ECU 7 controls the motor M such that the restriction by the lock mechanism 4 is performed regardless of the operation of the operation switch (forced restriction control). In the present embodiment, the forced restriction conditions correspond to emergency conditions, which are satisfied if the vehicle collision is detected or if it is determined that the vehicle collision is likely to be caused.

Figure 5:
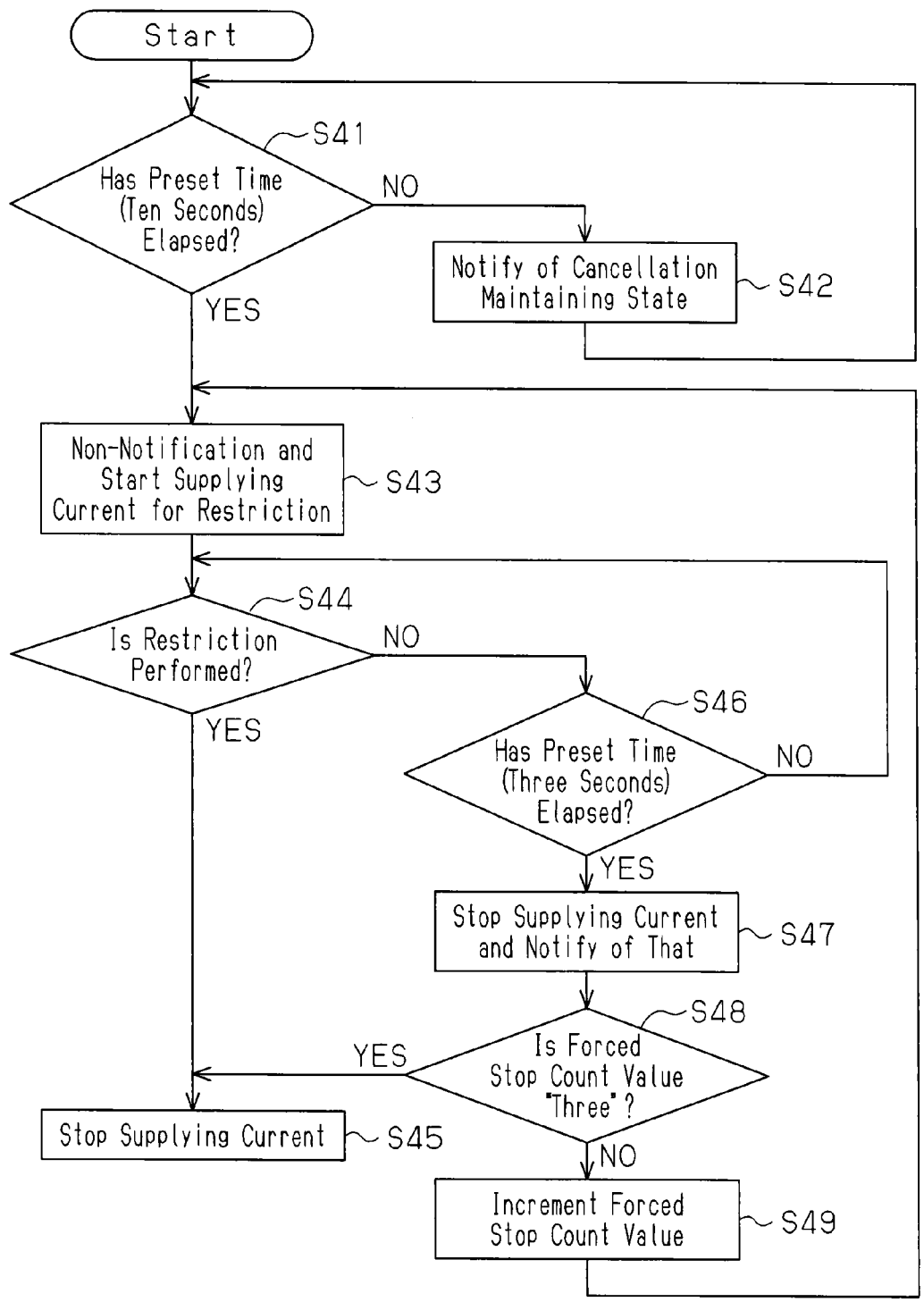
FIG. 5 is a flowchart for illustrating a process executed by the ECU of the present embodiment.

Next, if the hand is taken off the side switch 8 so that the side switch 8 is automatically restored from the state in which the process has proceeded to step 14 to its original position to perform the restriction by the lock mechanism 4, the ECU 7 starts a process shown in FIG. 5, and controls the motor M to maintain the state in which the restriction by the lock mechanism 4 is cancelled until preset restriction conditions except for the operation of the operation switch are satisfied (restriction limitation control).

In detail, the restriction conditions of the present embodiment correspond to the time lapse restriction condition, which is satisfied if a preset time (for example, ten seconds) has elapsed since the operation switch (the side switch 8 or the rear switch 9) has been operated. That is, in step S41, it is determined whether or not the preset time (for example, ten seconds) has elapsed since the operation switch (the side switch 8 or the rear switch 9) has been operated (namely, automatically restored to its original position). If the ECU 7 determines that the preset time (for example, ten seconds) has not elapsed, the process proceeds to step S42. In step S42, the ECU 7 operates the notifier 14 to be in the notifying mode to allow the notifier 14 to provide notice of the state (for example, the fact that the canceled state is still maintained), and the process returns to step S41.

In step S41, if the preset time (for example, ten seconds) has elapsed, the process of the ECU 7 proceeds to step S43.

In step S43, the ECU 7 operates the notifier 14 to be in the non-notifying mode (for example, the ECU 7 allows the notifier 14 to stop providing notice of the continuation of the cancellation), and starts supplying the current to the motor M to drive the output portion in the reverse direction, which is the direction in which the restriction by the lock mechanism 4 is performed, and the process proceeds to step S44.

In step S44, the ECU 7 determines whether or not the restriction limit switch 6 has detected that the restriction by the lock mechanism 4 has been performed. If the restriction limit switch 6 detects that the restriction has been performed, the process proceeds to step S45 to stop supplying the current to the motor M. If the restriction is not detected, the process of the ECU 7 proceeds to step S46.

In step S46, the ECU 7 determines whether or not a preset time (for example, three seconds) has elapsed since the current supply has been started. If the preset time (for example, three seconds) has not elapsed, the process returns to step S44. That is, when the restriction is performed on the basis of the operation of the operation switch (the side switch 8 or the rear switch 9), the ECU 7 supplies the current to the motor M such that the output portion is driven in the reverse direction until the restriction limit switch 6 detects the restriction. The ECU 7 stops supplying the current to the motor M if the restriction is detected before the preset time (for example, three seconds) elapses. The preset time (for example, three seconds) in step S46 corresponds to a time in which the restriction is detected by the restriction limit switch 6 before the time elapses when normally operated. For example, the preset time corresponds to a time that elapses when certain failure is caused in the power transmission pathway.

In step S46, if the preset time (for example, three seconds) has elapsed, the process of the ECU 7 proceeds to step S47.

In step S47, the ECU 7 stops supplying the current to the motor M and operates the notifier 14 to be in the notifying mode to allow the notifier 14 to provide notice of the state (for example, the fact that the restriction is not normally performed), and the process proceeds to step S48.

In step S48, the ECU 7 determines whether or not a forced stop count value is "three". If the forced stop count value is not "three", the process proceeds to step S49. In step S49, the ECU 7 increments the forced stop count value (an initial value is "zero") by one (+1), and the process returns to step S43. In step S48, if the forced stop count value is "three", the process proceeds to step S45 and the discontinuation of the supply of current to the motor M is maintained. That is, if the preset time (for example, three seconds) has elapsed without detecting the restriction by the restriction limit switch 6, the ECU 7 stops supplying the current to the motor M. Thereafter, the retry control for supplying the current to the motor M again is repeated a preset number of times (in this example, three times).

Next, the operation of the vehicle seat device as configured above will be described.

For example, even if the side switch 8 is being pushed to cancel the restriction by the lock mechanism 4, the restriction will not be cancelled while the vehicle is running.

If the vehicle speed is zero, that is, if the vehicle is stopped, the current supply to the motor M is supplied so that the motor is driven in the direction in which the restriction is cancelled. In this case, the operation of the other operation switch (other than the operated side switch 8), namely, the rear switch 9, is disabled for a preset time (for example, three minutes).

If the cancellation limit switch 5 detects that the restriction by the lock mechanism 4 has been cancelled, the supply of current to the motor M is stopped. If it is determined that the collision detection sensor 12 and the collision prediction sensor 13 detect the vehicle collision or that the vehicle collision is likely to be caused after it is detected that the restriction has been cancelled, the current is supplied to the motor M in the direction in which the restriction is performed so that the restriction by the lock mechanism 4 is performed and the notifier 14 provides notice of the state. If the preset time (for example, three seconds) has elapsed without detecting that the restriction is cancelled by the cancellation limit switch 5 from when the supply of current began, the supply of current to the motor M is stopped. Thereafter, the retry control for again supplying the current to the motor M is repeated a preset number of times (in this example, three times).

If the hand is taken off the side switch 8 in the when the restriction by the lock mechanism 4 is cancelled and the supply of current to the motor M is stopped, the cancellation of the restriction is maintained until the preset time (for example, ten seconds) elapses after the side switch 8 is automatically restored to its original position, and the notifier 14 gives notice of the state. If the preset time (for example, ten seconds) has elapsed, the supply of current to the motor M is started in the direction in which the restriction is performed.

If the restriction limit switch 6 detects that the restriction by the lock mechanism 4 has been performed, the supply of current to the motor M is stopped. If the preset time (for example, three seconds) elapsed without detecting by the restriction limit switch 6 that the restriction was performed after the supply of current was started, the supply of current to the motor M is stopped. Thereafter, the retry control for supplying the current to the motor M again is repeated a preset number of times (in this example, three times).

The above embodiment has the following advantages.

(1) When performing the restriction by the lock mechanism 4 on the basis of the operation of the operation switch (the side switch 8 or the rear switch 9), the motor M is controlled by the ECU 7 such that the cancellation of the restriction by the lock mechanism 4 is maintained until the preset restriction conditions, other than the operation of the operation switch, are satisfied. Specifically, in the present embodiment, the restriction conditions correspond to the time lapse restriction condition, which is satisfied if the preset time (for example, ten seconds) elapses after the operation switch is operated. Accordingly, the cancellation of the restriction by the lock mechanism 4 is maintained until the preset time (for example, ten seconds) elapses. Therefore, for example, the seat 1 is freely movable until the preset time elapses even when the operation switch is not operated to improve the convenience of the seat.

(2) The operation switch (the side switch 8 or the rear switch 9) corresponds to an automatic restoration push button type operation switch set to maintain the cancelled state when it is biased (pushed), and is automatically restored to cause the restricted state in the case where it is not biased (pushed) (the hand is taken off). Therefore, the seat 1 is freely movable until the restriction conditions are satisfied even after the hand is taken off the operation switch for improved convenience.

(3) The operation switch (the side switch 8 or the rear switch 9) includes the rear switch 9 arranged on the rear surface of the seat back 3. Accordingly, the seat 1 is freely movable until the restriction conditions are satisfied even after an occupant seated on a seat behind the seat back 3 biases (pushes) the rear switch and then leaves the hand off the rear switch, for example. This makes it easier for the occupant to exit the vehicle through a front vehicle door.

(4) When performing the restriction by the lock mechanism 4 on the basis of the operation of the operation switch, the ECU 7 operates the notifier 14 to be in the notifying mode so that the notifier 14 gives notice of the state (for example, notice that the restriction is cancelled) until the restriction conditions are satisfied. This makes it easier for the occupant to recognize that the cancellation of the restriction continues.

(5) When cancelling the restriction by the lock mechanism 4 by operating the operation switch (the side switch 8 or the rear switch 9), current is supplied to the motor M by the ECU 7 such that the motor M is driven in the forward direction (direction in which the restriction is cancelled) until the cancellation limit switch 5 detects the cancellation. When the cancellation is detected, the supply of current to the motor M is stopped by the ECU 7. Since the motor M has a self-constriction force, the motor M cannot be moved when no current is being supplied. Even if the operation of the operation switch to cancel the restriction is continued, the flow of the current is intercepted and the cancellation of the restriction by the lock mechanism is maintained. When performing the restriction by operating the operation switch, the current is supplied to the motor M by the ECU 7 such that the motor M is driven in the reverse direction (the direction in which the restriction is performed) until the restriction is detected by the restriction limit switch 6. When the restriction is detected, the supply of current to the motor M is stopped by the ECU 7. Accordingly, the flow of the current is intercepted after the restriction by the lock mechanism 4 is performed. Therefore, the current cannot continue to flow into the motor M, which improves the life of the motor and reduces power consumption in comparison to a device in which the current continues to flow.

(6) If the preset forced stop conditions except for the detection by the cancellation limit switch 5 or the restriction limit switch 6 are satisfied in the case where the current is supplied to the motor M, the current supply to the motor M is stopped by the ECU 7. Specifically, in the present embodiment, the forced stop conditions correspond to the time lapse forced stop conditions, which are satisfied if the preset time (for example, three seconds) has elapsed. Accordingly, for example, even if certain failure is caused in the cancellation limit switch 5 or the restriction limit switch 6, the current is restricted from continuing to flow into the motor M when the preset time (for example, three seconds) has elapsed.

(7) If the forced stop conditions (time lapse forced stop conditions) are satisfied, the supply of current to the motor M is stopped by the ECU 7, and the retry control for supplying the current to the motor M again is performed the preset number of times (in the present embodiment, three times). Accordingly, when a slight mechanical catch is caused, it may be cancelled by the retry control. Therefore, the normal drive conditions are more likely to be recovered, for example.

(8) If the forced stop conditions (time lapse forced stop conditions) are satisfied, the ECU 7 operates the notifier 14 to be in the notifying mode so that the notifier 14 to gives notice of the state. This facilitates recognition by the occupant that the forced stop conditions (time lapse forced stop conditions) are satisfied.

(9) When cancelling the restriction by the lock mechanism 4 by operation of the operation switch (the side switch 8 or the rear switch 9), the motor M is controlled by the ECU 7 such that restriction of the sliding of the seat is maintained until the preset cancellation conditions, other than operation of the operation switch, are satisfied. Specifically, in the present embodiment, the cancellation conditions correspond to the vehicle speed cancellation conditions. That is, the conditions are satisfied if the vehicle speed is zero when the operation switch is operated. Accordingly, the restriction by the lock mechanism 4 is maintained until the vehicle speed becomes zero. That is, the restriction is continued while the vehicle is running. Therefore, for example, abrupt sliding of the seat 1 due to the behavior of the vehicle is limited.

(10) The ECU 7 controls the motor M on the basis of the operation of the first one of the side switch 8 and the rear switch 9 that is operated (for example, the side switch 8) and thereafter disables the operation of the other operation switch (for example, the rear switch 9) until the priority termination conditions are satisfied. Therefore, the operation of the first-operated operation switch is given priority, so that abnormal operation caused by operating the other operation switch, for example, is limited.

(11) Because the priority termination conditions include a time termination condition, which is satisfied if the preset time (for example, three minutes) has elapsed, the operation of the other operation switch is disabled until the preset time (for example, three minutes) has elapsed. Accordingly, for example, the operation of the first-operated operation switch is given priority so that abnormal operation is limited. Further, if the cancellation of the restriction continues over the preset time (for example, three minutes) due to any abnormality such as fixation of the operation switch, the other operation switch is operated so that restriction by the lock mechanism 4 is performed.

(12) In the case where the restriction by the lock mechanism 4 is cancelled on the basis of the operation of the operation switch (the side switch 8 or the rear switch 9), if the forced restriction conditions, other than operation of the operation switch, are satisfied, the motor M is controlled by the ECU 7 such that restriction by the lock mechanism 4 is performed regardless of the operation of the operation switch (forced restriction control). Specifically, in the present embodiment, the forced restriction conditions correspond to emergency conditions, which are satisfied if a vehicle collision is detected or if it is determined that a vehicle collision is likely to occur. Accordingly, restriction by the lock mechanism 4 is immediately performed in case of such an emergency so that the seat 1 is fixed.

(13) If the forced restriction conditions (emergency conditions) are satisfied, the notifier 14 is operated to be in the notifying mode so that the notifier 14 provides notice of the state. This facilitates recognition by the occupant that the forced restriction conditions (emergency conditions) are satisfied.

The above described embodiment may be modified as follows.

The cancellation conditions (refer to step S11 in FIG. 2) of the above described embodiment may be changed to other cancellation conditions. For example, the cancellation conditions may correspond to seat cancellation conditions that are satisfied if no occupant is seated on the seat 1 when the rear switch 9 is operated (refer to FIG. 6).

Figure 6:
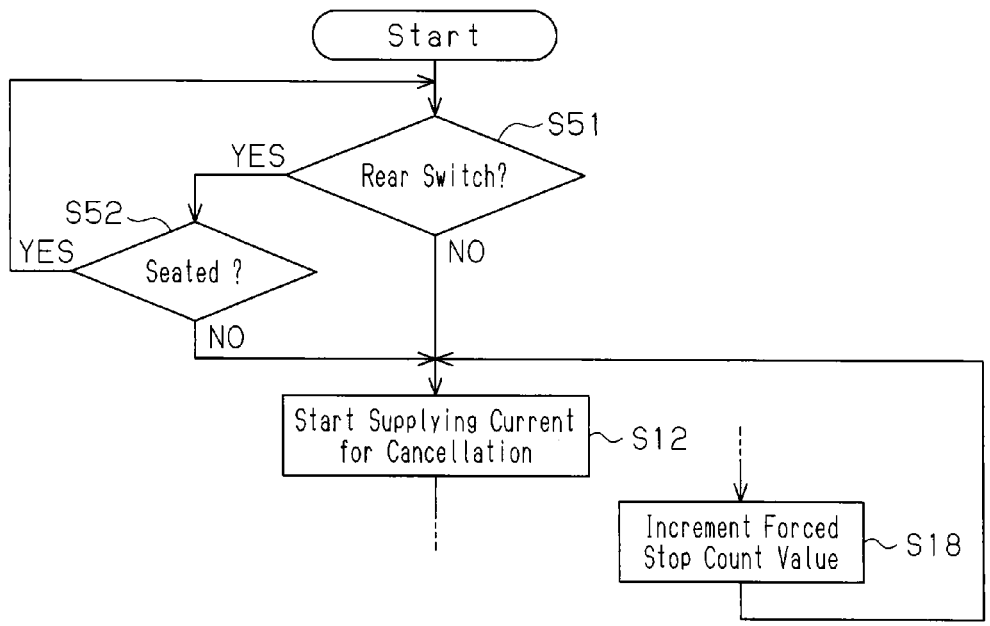
FIG. 6 is a flowchart for illustrating a process executed by an ECU of another embodiment.

That is, when the operation switch (the side switch 8 or the rear switch 9) is being pushed to cancel the restriction by the lock mechanism 4, the ECU 7 determines whether or not the operated operation switch is the rear switch 9 in step S51 as shown in FIG. 6. If the operated operation switch is not the rear switch 9 (namely, the operated operation switch is the side switch 8), the process proceeds to step S12 (hereinafter, refer to FIG. 2). If the operated operation switch is the rear switch 9, the process of the ECU 7 proceeds to step S52. In step S52, the ECU 7 determines whether or not the occupant is seated on the seat 1 on the basis of the information detected by the seat detection sensor 10. If the ECU 7 determines that the occupant is not seated on the seat 1, the process proceeds to step S12 (hereinafter, refer to FIG. 2). If the occupant is seated, the process returns to step S51.

Accordingly, even if the rear switch 9 is operated, the state in which the restriction by the lock mechanism 4 is performed is maintained until the occupant seated on the seat 1 becomes absent. Therefore, for example, abrupt sliding of the seat 1 caused by operating the rear switch 9 from behind (with respect to the seated occupant) is limited.

The restriction conditions (refer to step S41 in FIG. 5) of the above described embodiment may be changed to other restriction conditions.

Figure 7:
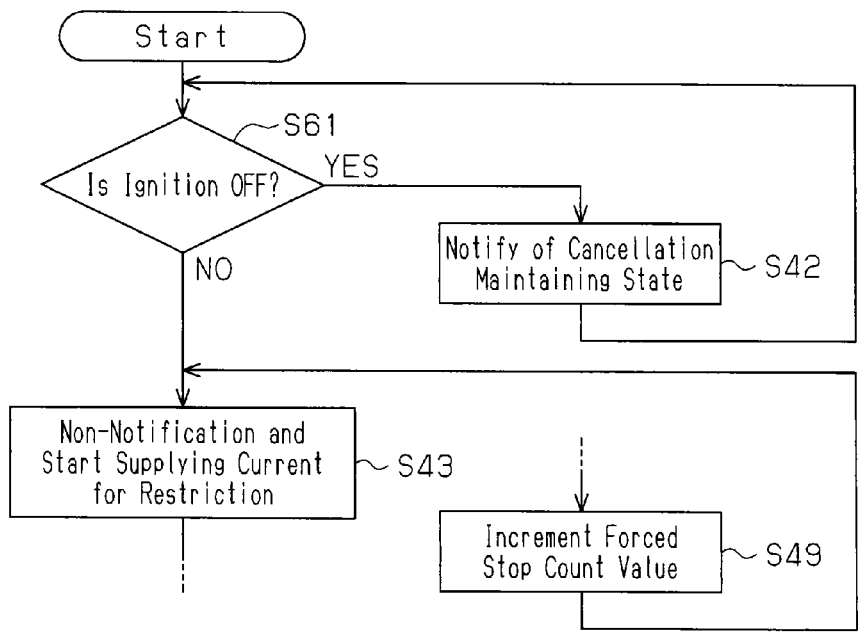
FIG. 7 is a flowchart for illustrating a process executed by the ECU of the other embodiment.

For example, the restriction conditions may correspond to ignition restriction conditions that are satisfied if the ignition is turned ON in the case where the ignition is OFF when the operation switch is operated (refer to FIG. 7).

That is, when the hand is taken off the side switch 8 (when the side switch 8 is automatically restored to its original position) in the state in which the restriction by the lock mechanism 4 is cancelled and the supply of current to the motor M is stopped, it is determined whether the ignition is OFF of not (namely, ON) on the basis of the information detected by the ignition sensor 15 in step S61. If the ECU 7 determines that the ignition is OFF, the process proceeds to step S42. In step S42, the ECU 7 operates the notifier 14 to be in the notifying mode to allow the notifier 14 to give notice of the state (for example, the fact that the canceled state is still maintained), and the process returns to step S61. If the ECU 7 determines that the ignition is ON in step S61, the process proceeds to step S43 (hereinafter, refer to FIG. 5).

Accordingly, the cancellation of the restriction by the lock mechanism 4 is maintained until the ignition is turned ON even if the hand is taken off the side switch 8. Therefore, for example, even when the operation switch is not operated, the seat 1 is freely movable until the ignition is turned ON, which makes use of the seat more convenient.

Figure 8:
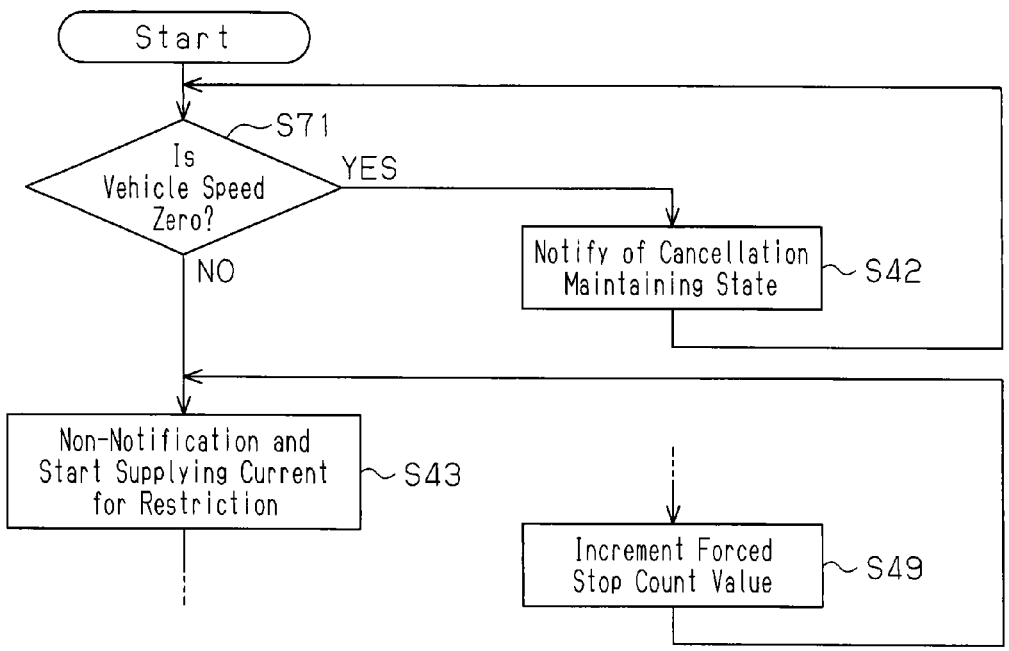
FIG. 8 is a flowchart for illustrating a process executed by the ECU of the other embodiment.

For example, the restriction conditions may correspond to the vehicle speed restriction conditions that are satisfied in the case where the vehicle speed is not zero if the vehicle speed was zero when the operation switch was operated (refer to FIG. 8).

That is, when the hand is taken off the side switch 8 (when the side switch 8 is automatically restored to its original position) in the state in which the restriction by the lock mechanism 4 is cancelled and the supply of current to the motor M is stopped, the ECU 7 determines whether or not the vehicle speed detected by the vehicle speed sensor 11 is zero in step S71. If the ECU 7 determines that the vehicle speed is zero, the process proceeds to step S42. In step S42, the ECU 7 operates the notifier 14 to be in the notifying mode to allow the notifier 14 to give notice of the state (for example, to give notice of the fact that the canceled state is still maintained), and the process returns to step S71. If the ECU 7 determines that the vehicle speed is not zero in step S71, that is, if it determines that the vehicle is running, the process proceeds to step S43 (hereinafter, refer to FIG. 5).

Accordingly, even if the hand is taken off the side switch 8, the cancellation of the restriction by the lock mechanism 4 is maintained until the vehicle speed is not zero, that is, the vehicle is moving. Therefore, for example, the seat 1 is freely movable until the vehicle moves even when the operation switch is not operated to make use of the seat more convenient.

Figure 9:
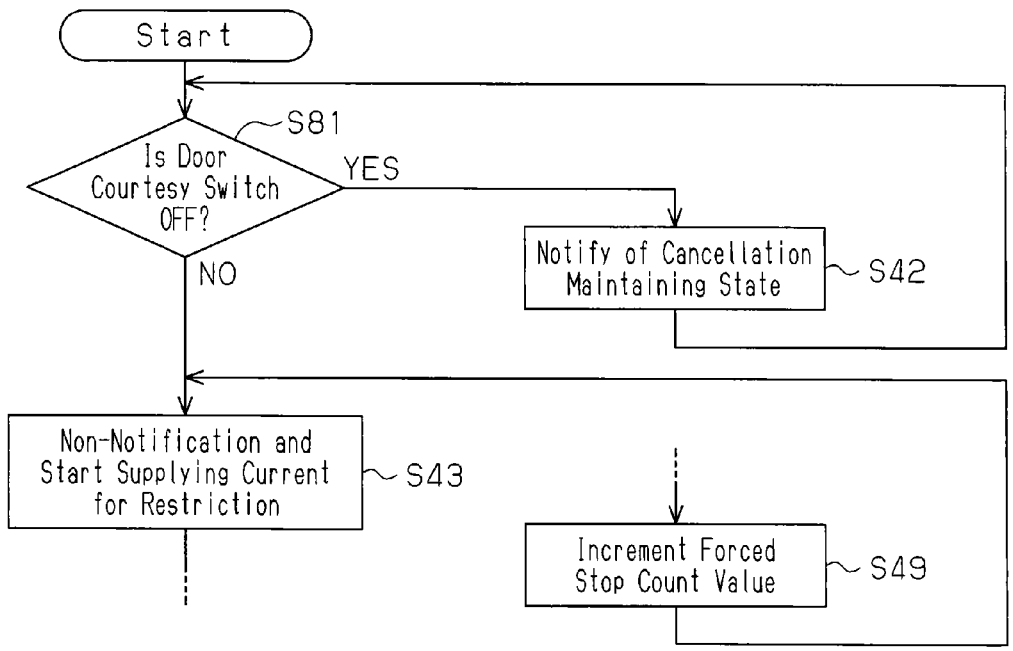
FIG. 9 is a flowchart for illustrating a process executed by the ECU of the other embodiment.

For example, the restriction conditions may correspond to door restriction conditions that are satisfied in the case where the vehicle door is brought into the closed state if the vehicle door has been in the opened state when the operation switch has been operated (refer to FIG. 9).

That is, when the hand is taken off the side switch 8 in the state in which the restriction by the lock mechanism 4 is cancelled and the supply of current to the motor M is stopped, the ECU 7 determines whether the vehicle door is in the opened state (off) or in the closed state (on) on the basis of the information detected by the door courtesy switch 16 in step S81. If the ECU 7 determines that the vehicle door is in the opened state (off), the process proceeds to step S42. In step S42, the ECU 7 operates the notifier 14 to be in the notifying mode to allow the notifier 14 to give notice of the state (for example, the fact that the canceled state is still maintained), and the process returns to step S81. If the ECU 7 determines that the vehicle door is in the closed state (on) in step S81, the process proceeds to step S43 (hereinafter, refer to FIG. 5).

Accordingly, even if the hand is taken off the side switch 8, the cancellation of the restriction by the lock mechanism 4 is maintained until it is detected that the vehicle door is closed. Therefore, for example, the seat 1 is freely movable until it is detected that the vehicle door is closed even when the operation switch is not operated to make use of the seat more convenient.

For example, the restriction conditions may correspond to post collision restriction conditions that are satisfied in the case where a flag of the collision detection is reset if the collision has been detected when the operation switch has been operated (refer to FIG. 10).

That is, when the hand is taken off the side switch 8 (when the side switch 8 is automatically restored to its original position) in the state in which the restriction by the lock mechanism 4 is cancelled and the supply of current to the motor is stopped, the ECU 7 determines whether or not the vehicle collision has been detected by the collision detection sensor 12 in step S91. If the ECU 7 determines that the vehicle collision has been detected, the process proceeds to step S42. It is determined whether or not the vehicle collision has been detected by the collision detection sensor 12 according to the collision detection flag. Specifically, it is determined whether the collision detection flag, which is set as "one" when the vehicle collision is detected, is "one" or not (namely "zero"). If the ECU 7 determines that the collision detection flag is "one", the process proceeds to step S42. The collision detection flag is maintained as "one" until it is reset in a maintenance factory, for example. If the collision detection flag is reset, it is set as "zero". In step S42, the ECU 7 operates the notifier 14 to be in the notifying mode so that the notifier 14 provides notice of the state (for example, the fact that the canceled state is still maintained), and the process returns to step S91. If the ECU 7 determines that the vehicle collision has not been detected, namely the collision detection flag is "zero" in step S91, the process proceeds to step S43 (hereinafter, refer to FIG. 5).

Accordingly, even if the hand is taken off the side switch 8, the cancellation of the restriction by the lock mechanism 4 is maintained if the collision has been detected (until the collision detection flag is reset). Therefore, for example, the seat 1 is freely movable if the collision has been detected even when the operation switch is not operated to make use of the seat more convenient.

The forced restriction conditions (refer to step S31 in FIG. 4) of the above described embodiment may be changed to other forced restriction conditions.

For example, the forced restriction conditions may correspond to time lapse forced restriction conditions that are satisfied if a preset time (for example, 20 seconds) elapses after the restriction by the lock mechanism 4 is cancelled in the state in which the vehicle speed is not zero (refer to FIG. 11).

That is, when it is detected that the restriction has been cancelled in step S13 (refer to FIG. 2), the ECU 7 starts a process shown in FIG. 11 in parallel with the process in step S14.

As shown in FIG. 11, in step S101, the ECU 7 determines whether or not the preset time (for example, twenty seconds)

has elapsed since the restriction was cancelled in the state in which the vehicle speed is not zero. If the ECU 7 determines that the preset time (for example, twenty seconds) has elapsed in the state in which the vehicle speed is not zero, the process proceeds to step S102. If the preset time (for example, twenty seconds) has not elapsed in the state in which the vehicle speed is not zero, step S101 is repeated.

In step S102, the ECU 7 supplies the current to the motor M such that the output portion is driven in the reverse direction, which is the direction in which the restriction by the lock mechanism 4 is performed, and operates the notifier 14 to be in the notifying mode so that the notifier 14 provides notice of the state (for example, notice that the seat is being restricted by the lock mechanism 4).

Accordingly, when the preset time (for example, twenty seconds) has elapsed when the vehicle speed is not zero, the restriction by the lock mechanism 4 is performed so that the seat 1 is fixed. Therefore, the cancellation of the restriction while the vehicle has been running for a long time (for example, longer than twenty seconds) is discontinued.

In the above embodiment, the seat 1 is provided in a slidable manner along the lower rail, which extends in the vehicle front back direction, and the lock mechanism 4 restricts the sliding movement thereof in the vehicle front back direction. However, the direction of the sliding movement is not limited to this.

Figure 13:
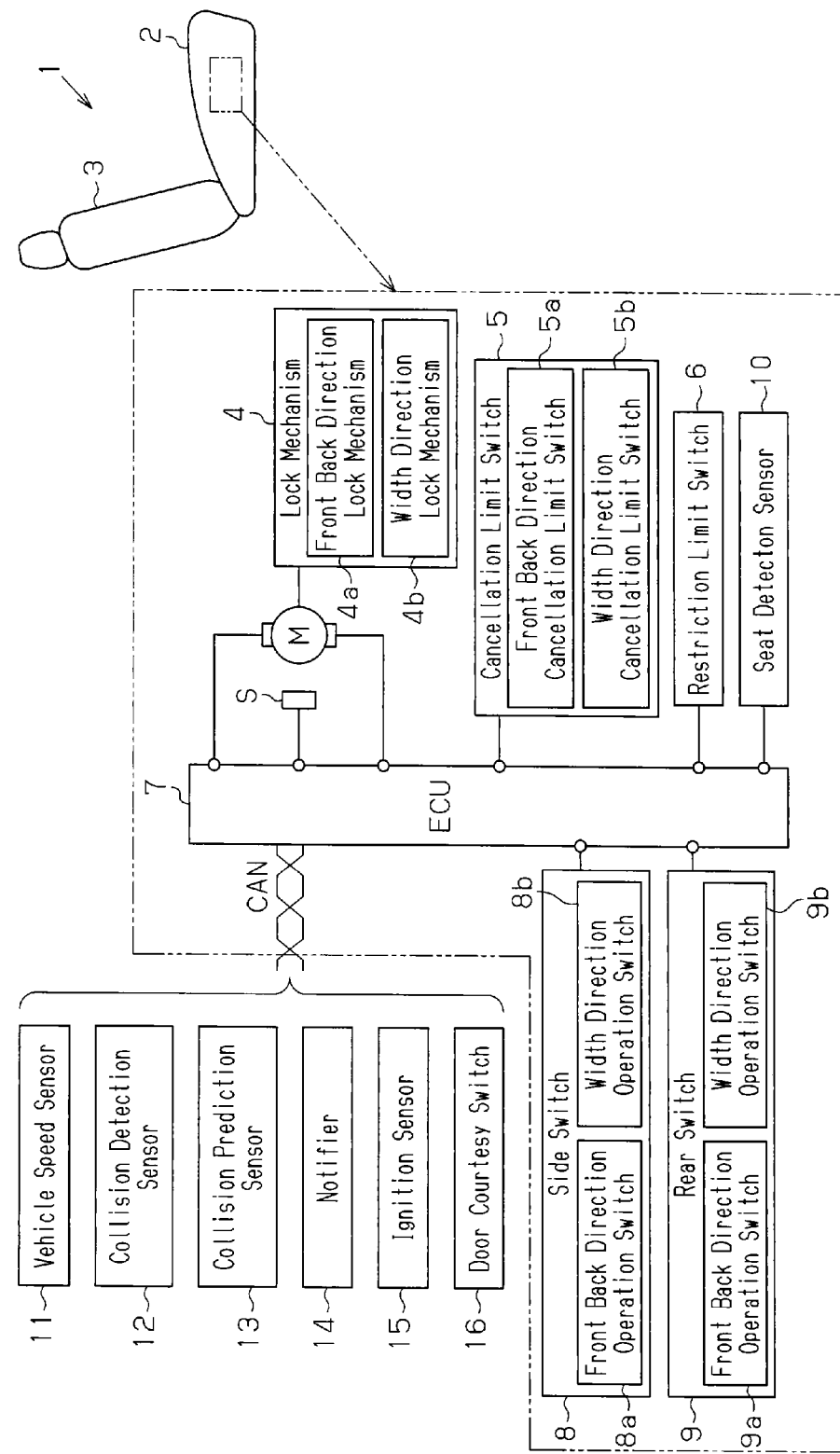
FIG. 13 is a block diagram for illustrating the vehicle seat device according to the other embodiment.

For example, the seat 1 may be embodied in a slidable manner in each of the vehicle front back direction and the vehicle width direction. In this case, as shown in FIG. 13, for example, the lock mechanism 4 is configured to include a front back direction lock mechanism 4a for restricting the sliding movement of the seat 1 in the vehicle front back direction, a width direction lock mechanism 4b for restricting the sliding movement of the seat 1 in the vehicle width direction, and front back direction operation switches 8a and 9a, and width direction operation switches 8b and 9b as operation switches respectively corresponding to the mechanisms. In this case, the ECU 7 may control the motor M on the basis of the operation of the first operated ones of the front back direction operation switches 8a and 9a and the width direction operation switches 8b and 9b, and thereafter disable the operation of the other operation switch until direction priority termination conditions are satisfied. The direction priority termination conditions correspond to, for example, time termination condition, which is satisfied if a preset time (for example, three minutes) has elapsed, as well as the priority termination conditions. Accordingly, for example, the operation of the first operated ones of the front back direction operation switches 8a and 9a and the width direction operation switches 8b and 9b are given priority so that the cancellation of the restriction by the front back direction lock mechanism 4a and the cancellation of the restriction by the width direction lock mechanism 4b are restricted from being performed simultaneously. The front back direction operation switches 8a and 9a and the width direction operation switches 8b and 9b may be configured to be arranged on the lateral surface of the seat cushion 2 (including side switches 8a and 8b) and the rear surface of the seat back 3 (including rear switches 9a and 9b), or only one of the switches may be configured to be arranged thereon.

In this case, the motor M (drive source) drives the output portion in two directions, namely the forward and the reverse directions. The motor M may be provided such that it drives the output portion in the forward direction from a neutral position to cancel the restriction by the front back direction lock mechanism 4a and drives the output portion in the reverse direction from the neutral position to cancel the restriction by the width direction lock mechanism 4b. Accordingly, each of the restrictions by the two lock mechanisms (the front back direction lock mechanism 4a and the width direction lock mechanism 4b) is cancelled, and the number of the motor M (drive source) is reduced (to one) in comparison to the case where the drive source is provided for each of the two lock mechanisms. The motor M (drive source) is generally heavy and of high cost. Accordingly, the number of the motor M (drive source) is reduced so that the weight and the cost of the seat 1 to be mounted are reduced, for example.

In this case, as shown in FIG. 13, the cancellation detection portion (cancellation limit switch 5) may be configured to include a front back direction cancellation limit switch 5a (front back direction cancellation detection portion), which detects that the restriction by the front back direction lock mechanism 4a is cancelled, and a width direction cancellation limit switch 5b (width direction cancellation detection portion), which detects that the restriction by the width direction lock mechanism 4b is cancelled. The ECU 7 may be configured to disable the operations of the operation switches (the front back direction operation switches 8a and 9a and the width direction operation switches 8b and 9b) after the front back direction cancellation limit switch 5a and the width direction cancellation limit switch 5b detect that the restrictions are simultaneously cancelled. If the front back direction cancellation limit switch 5a and the width direction cancellation limit switch 5b detect that the restrictions are simultaneously cancelled, the ECU 7 may be configured to operate the notifier 14 to be in the notifying mode to allow the notifier 14 to give notice of the state. Specifically, for example, if the operation switch (the front back direction operation switches 8a and 9a or the width direction operation switches 8b and 9b) is operated, the ECU 7 starts a process shown in FIG. 12 in parallel with the process of the normal operations (for example, refer to FIG. 2 or FIG. 5). If the front back direction cancellation limit switch 5a and the width direction cancellation limit switch 5b detect that the restrictions are simultaneously cancelled in step S111, the process proceeds to step S112 in which the ECU 7 disables the operations of the operation switches (the front back direction operation switches 8a, and 9a and the width direction operation switches 8b and 9b), and operates the notifier 14 to be in the notifying mode to allow the notifier 14 to give notice of the state. If it is not detected that the restrictions are simultaneously cancelled, step S111 is repeated.

Accordingly, after it is detected that the restrictions are simultaneously cancelled, the operation switches (the front back direction operation switches 8a and 9a and the width direction operation switches 8b and 9b) are disabled. Therefore, the current is prevented from being supplied to the motor M when certain failure is caused (when the restrictions are simultaneously cancelled although the device is normally configured such that only one of restriction by the front back direction lock mechanism 4a and the restriction by the width direction lock mechanism 4b is cancelled). The notifier 14 is operated to be in the notifying mode to be allowed to give notice of the state. This facilitates recognition by the occupant that certain failure is caused.

Although this is not referred to in the above described embodiment, if the above emergency conditions are satisfied, namely, if it is determined that the vehicle collision is detected or the vehicle collision is likely to be caused in step S31 shown in FIG. 4, the ECU 7 may control the motor M such that the restriction by the lock mechanism 4 is performed faster than usual. The motor M is normally driven at an optimum speed in consideration of various effects such as a noise and a vibration of the motor M. In contrast, if the emergency conditions are satisfied, the motor M is driven at a speed faster than usual even if the noise and the vibration are increased.

Accordingly, in case of emergency, the restriction by the lock mechanism 4 is more immediately performed so that the seat 1 is fixed.

In the above described embodiment, the cancellation detection portion and the restriction detection portion correspond to the limit switches (the cancellation limit switch 5 and the restriction limit switch 6). The detection portions are not limited to these. The cancellation detection portion may be another solution that detects that the restriction by the lock mechanism 4 is cancelled. The restriction detection portion may be another solution that detects that the restriction by the lock mechanism 4 is performed. For example, the cancellation detection portion and the restriction detection portion may be the rotation sensor S or the lock current detection portion. When the rotation sensor S is used as the detection portions, it may be detected that the restriction is cancelled or the restriction is performed on the basis of the number of pulses supplied from the rotation sensor S, for example. Alternatively, it may be detected that the restriction is cancelled or the restriction is performed on the basis of the time that elapses after the pulses stop (that is, it is determined that the device is mechanically stopped). When the lock current detection portion is used as the detection portions, for example, a current value of the supplied current is detected so that it may be detected that the restriction is cancelled or the restriction is performed on the basis of the current value (that is, when the current becomes the lock current, it is determined that the device is mechanically stopped). A timer may be used as the cancellation detection portion and the restriction detection portion, for example. In this case, however, the forced stop conditions (time lapse forced stop condition, which is satisfied if the preset time has elapsed) in the above described embodiment cannot be adopted.

In the above described embodiment, the forced stop conditions correspond to the time lapse forced stop condition, which is satisfied if the preset time has elapsed. However, the forced stop conditions are not limited to these. The forced stop conditions may correspond to other conditions. For example, the forced stop conditions may correspond to conditions that are satisfied if the number of the pulses supplied from the rotation sensor S exceeds a preset number. Accordingly, even if certain failure is caused in the cancellation detection portion and the restriction detection portion (such as the cancellation limit switch 5 and the restriction limit switch 6), the current is restricted from continuing to flow into the motor M if the number of the pulses supplied from the rotation sensor S exceeds the preset number.

Although this is not especially referred to in the above described embodiment, the seat 1 may include an ottoman. The ECU 7 may be configured such that the ottoman is accommodated when the restriction is cancelled on the basis of the operation of the operation switch. Accordingly, in the case where the restriction is cancelled, the ottoman does not interfere with the seat 1 when the seat 1 is allowed to slide.

Although this is not especially referred to in the above described embodiment, the ECU 7 may be configured to control the motor M such that the restriction by the lock mechanism 4 is cancelled regardless of the operation of the operation switch when the seat back 3 is tilted forward (that is, the seat back 3 is completely turned down). The ECU 7 may be configured to control the motor M such that the restriction by the lock mechanism 4 is performed regardless of the operation of the operation switch when the seat back 3 is turned up thereafter. This makes it easier for the occupant seated on the seat behind the seat back to exit the vehicle through the front vehicle door, for example.

The above described embodiment and each of other embodiments may be not only modified but also combined.

The invention claimed is:

1. A vehicle seat device comprising
   a lock mechanism, which restricts sliding movement of a seat;
   a drive source, which drives the lock mechanism to restrict the sliding movement of the seat and cancel the restriction thereof based on operation of an operation switch; and
   a control portion, which performs cancellation limitation control, restriction limitation control, and forced restriction control, wherein
   in the cancellation limitation control, the control portion controls the drive source such that when cancelling the restriction by the lock mechanism based on the operation of the operation switch, a state in which the restriction by the lock mechanism is performed is maintained until preset cancellation conditions, other than the operation of the operation switch, are satisfied,
   in the restriction limitation control, the control portion controls the drive source such that when performing the restriction by the lock mechanism based on the operation of the operation switch, a state in which cancellation of the restriction by the lock mechanism is maintained until preset restriction conditions, other than the operation of the operation switch, are satisfied, and
   in the forced restriction control, the control portion controls the drive source such that when the restriction by the lock mechanism is cancelled based on the operation of the operation switch, when forced restriction conditions, other than the operation of the operation switch, are satisfied, the seat is restricted by the lock mechanism regardless of the operation of the operation switch.

2. The vehicle seat device according to claim 1, wherein the cancellation conditions include vehicle speed cancellation conditions, which are satisfied if vehicle speed is zero when the operation switch is operated.

3. The vehicle seat device according to claim 1, wherein the operation switch includes a rear switch arranged on a rear surface of a seat back.

4. The vehicle seat device according to claim 3, wherein the cancellation conditions include seating cancellation conditions, which are satisfied if no occupant is seated on the seat when the rear switch is operated.

5. The vehicle seat device according to claim 1, wherein
   the operation switch is one of a plurality of operation switches provided for the lock mechanism, and
   when the control portion performs the cancellation limitation control, the control portion controls the drive source based on the operation of the first operated one of the operation switches and thereafter disables other operation switches until priority termination conditions are satisfied.

6. The vehicle seat device according to claim 5, the priority termination conditions include time termination conditions, which are satisfied if a preset time has elapsed.

7. The vehicle seat device according to claim 1, wherein
   the lock mechanism includes a front back direction lock mechanism for restricting the sliding movement of the seat in a vehicle front back direction, and a width direction lock mechanism for restricting the sliding movement of the seat in a vehicle width direction, the operation switch includes a front back direction operation switch corresponding to the front back direction lock mechanism, and a width direction operation switch corresponding to the width direction lock mechanism, and the control portion controls the drive source based on operation of first operated one of the front back direction operation switch and the width direction operation switch, and thereafter disables operation of the other operation switch until direction priority termination conditions are satisfied.

8. The vehicle seat device according to claim 7, wherein the drive source includes an output portion, which can be driven in two directions, namely a forward direction and a reverse direction, and the drive source is configured to cancel restriction by the front back direction lock mechanism when the output portion is driven in a forward direction from a neutral position, the drive source cancels and the drive source is configured to cancel restriction by the width direction lock mechanism when the output portion is driven in a reverse direction from the neutral position.

9. The vehicle seat device according to claim 8, further comprising:

a front back direction cancellation detection portion, which detects that the restriction by the front back direction lock mechanism is cancelled; and a width direction cancellation detection portion, which detects that the restriction by the width direction lock mechanism is cancelled, wherein when the front back direction cancellation detection portion and the width direction cancellation detection portion simultaneously detect that the restrictions are cancelled, the control portion, thereafter, performs at least one of disablement control and a notification control, in the disablement control, the control portion disables operations of the front back direction operation switch and the width direction operation switch, and in the notification control, the control portion operates a notifier to be in a notifying mode so that the notifier notifies of a fact that the front back direction cancellation detection portion and the width direction cancellation detection portion simultaneously detect that the restrictions are cancelled.

10. The vehicle seat device according to claim 1, wherein the operation switch corresponds to an automatic restoration type operation switch configured to maintain the cancellation of the restriction by the lock mechanism when the operation switch is in a biased state, and be automatically restored to its original position when the operation switch is in a non-biased state to cause a state in which the seat is restricted by the lock mechanism.

11. The vehicle seat device according to claim 1, wherein the restriction conditions include at least any of a time lapse restriction condition, which is satisfied if a preset time elapses after the operation switch is operated, an ignition restriction condition, which is satisfied if an ignition switch is turned ON in a case where the ignition switch is OFF when the operation switch is operated, a vehicle speed restriction condition, which is satisfied if the vehicle speed is not zero in a case where the vehicle speed was zero when the operation switch was operated, a door restriction condition, which is satisfied if a vehicle door is brought into a closed state in a case where the vehicle door was in an opened state when the operation switch was operated, and a post collision restriction condition, which is satisfied if a flag of a vehicle collision detection is reset in a case where a vehicle collision has been detected when the operation switch was operated.

12. The vehicle seat device according to claim 1, wherein the forced restriction conditions include an emergency condition, which is satisfied if a vehicle collision is detected or if it is determined that the vehicle collision is likely to occur.

13. The vehicle seat device according to claim 12, wherein when the emergency condition is satisfied, the control portion controls the drive source such that the restriction by the lock mechanism is performed faster than in a case where the emergency condition is not satisfied.

14. The vehicle seat device according to claim 1, wherein the forced restriction conditions include a time lapse forced restriction condition, which is satisfied if a preset time has elapsed after the restriction by the lock mechanism was cancelled when vehicle speed is not zero.

* * * * *